May 8, 1945.  H. GROSSMAN  2,375,550
REMOVAL OF CAFFEIN FROM COFFEE EXTRACT
Filed Jan. 16, 1943
Fig. 1,
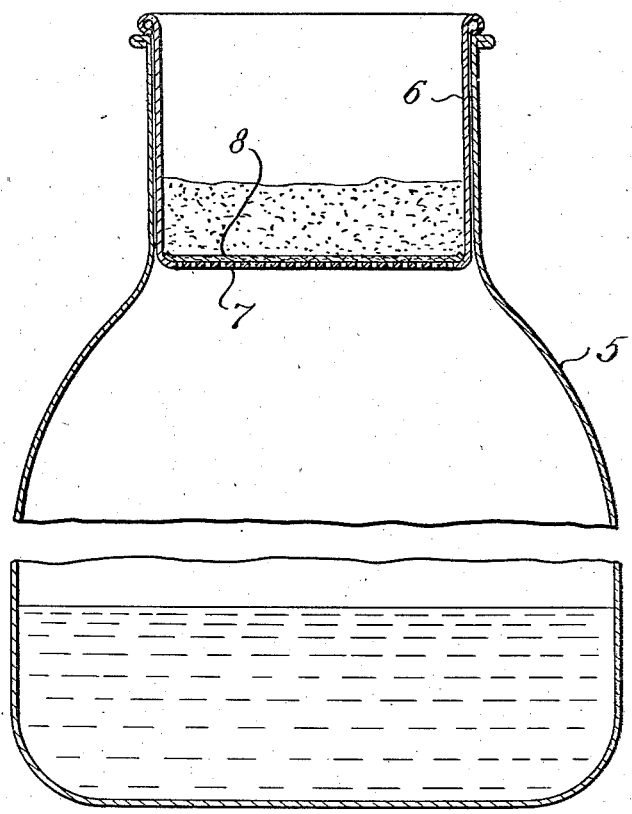
Fig. 2.
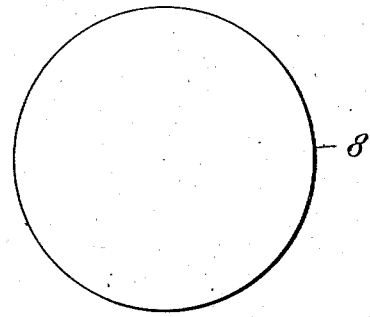
INVENTOR
HAROLD GROSSMAN
BY
ATTORNEYS Patented May 8, 1945

2,375,550

UNITED STATES PATENT OFFICE 2,375,550

REMOVAL OF CAFFEINE FROM COFFEE EXTRACT

Harold Grossman, Montclair, N. J.

Application January 16, 1943, Serial No. 472,558

4 Claims. (Cl. 99—69)

This invention relates to the preparation of coffee as a beverage and particularly the separation of caffeine from coffee extract during the preparation thereof.

Caffeine is a bitter alkaloid which is present in coffee and soluble in the water used to extract the essential oils and other elements which afford the pleasant taste and aroma of the beverage. Many persons are susceptible to nervous irritation caused by consumption of the alkaloid. Attempts have been made heretofore to remove caffeine from coffee. The methods used destroy much of the taste and aroma and the beverage is therefore unsatisfactory.

It is the purpose of the present invention to provide a simple and effective means for separating caffeine from coffee extract, preserving at the same time the desirable characteristics of the extract as a beverage.

Other objects and advantages of the invention will be apparent as it is better understood by reference to the following specification and accompanying drawing, in which Fig. 1 is a vertical section through a portion of a typical form of coffee maker embodying the invention; and Fig. 2 is a plan view of the filter element employed to remove the caffeine.

I have discovered that all or a substantial part of the caffeine which is dissolved in the preparation of coffee extract can be removed as the extract is formed by incorporating a selective adsorbent for the caffeine in a suitable support, preferably a filter paper, through which the extract is passed. While I prefer paper because it is inexpensive, effective, easily used and otherwise generally satisfactory, other forms of supports may be used. For example, the adsorbent can be enclosed in a casing of textile fabric or incorporated in a porous ceramic material. It is necessary merely to afford a medium through which the extract will pass and which will ensure contact of the extract with the adsorbent for the caffeine.

As a selective adsorbent for caffeine, I have found that certain hydrated silicates are most effective, notably hydrated aluminum silicate and hydrated magnesium tri-silicate. Fuller's earth, a natural form of aluminum silicate containing magnesium and other impurities, may be used in place of pure aluminum silicate. All of the materials mentioned are readily obtainable and each is effective in adsorbing caffeine from coffee extract, as the extract is formed, by simply passing the extract into contact with the adsorbing agent.

In the preferred form of the invention, a filter paper is prepared by beating with paper pulp (cellulose fibres) of the type commonly used in preparing filter paper, a proportion of the desired adsorbent material hereinbefore described. When the adsorbent material has been incorporated thoroughly with the pulp, the latter may be formed into paper in the usual manner. The thickness of the paper may vary. A paper having a thickness of the order of .005 inch is satisfactory. The details of paper manufacture form no part of the present invention and are well known to those skilled in the art.

The proportion of the adsorbent material employed may vary over a wide range. As little as 2% of the weight of the paper is effective, but the effect in removing caffeine is relatively slow. If more than 25% of the adsorbent is added, the paper is likely to be brittle. In general, I have found that about 10% of added adsorbent based on the weight of the paper is most satisfactory.

The paper may be formed in sheets of any desired size and filter elements of the desired size to fit extractors of various types may be cut therefrom. Usually the filter elements are circular. In use, the filter element may be placed on any suitable support such as a foraminous plate. The coffee is placed on the filter element and hot water is passed through the coffee and filter element. The extract is thus subjected to the action of the adsorbent which selectively removes the caffeine without affecting the taste and aroma of the beverage. Sufficient of the caffeine is thus separated to avoid the usual effect of the alkaloid on the nervous systems of sensitive persons.

Referring to the drawing, 5 indicates a receptacle for the beverage, supporting a cup 6 having a foraminous bottom 7. The filter element 8 covers the bottom 7 and the coffee is disposed thereon. Hot water is supplied from any source and poured through the coffee and filter element. The beverage collects in the receptacle 5 and the caffeine content is materially reduced as the result of adsorption in the filter element.

The simple coffee maker described may be replaced by the percolator or vacuum types of apparatus. The filter element serves the same purpose effectively in any apparatus in which the coffee extract can be passed therethrough, and hence into intimate contact with the adsorbent agent.

Preliminary treatment of coffee to remove caffeine is unnecessary to produce a beverage suitable for caffeine-sensitive individuals since, in accordance with the present invention, sufficient caffeine can be removed as the coffee extract is made and substantially without expense.

Various changes may be made in the details of the filter element and the apparatus in which it is used without departing from the invention or sacrificing the advantages thereof.

I claim:

1. The method of selectively removing caffeine from coffee extract which comprises contacting the extract with a silicate from the class consisting of aluminum and magnesium.

2. The method of brewing coffee extract which comprises supporting a mass of finely divided coffee above a filter medium embodying a silicate from the class consisting of aluminum and magnesium, passing hot water through the finely divided coffee to extract constituents therefrom and form a coffee brew, and then passing the brewed coffee through said filter medium to selectively remove caffeine therefrom.

3. The method of brewing coffee extract which comprises passing hot water serially through finely divided coffee and a filter sheet comprising cellulose fibers embodying aluminum silicate, whereby a coffee brew is obtained and caffeine then selectively removed therefrom.

4. The method of brewing coffee extract which comprises passing hot water serially through finely divided coffee and a filter sheet comprising cellulose fibers embodying magnesium tri-silicate, whereby a coffee brew is obtained and caffeine then selectively removed therefrom.

HAROLD GROSSMAN.